United States Patent [19]

Miksic et al.

[11] Patent Number: 5,139,700
[45] Date of Patent: Aug. 18, 1992

[54] VAPOR PHASE CORROSION INHIBITOR MATERIAL

[75] Inventors: Boris A. Miksic, North Oaks; Michael Tarvin, Roseville, both of Minn.

[73] Assignee: Cortec Corporation, St. Paul, Minn.

[21] Appl. No.: 594,357

[22] Filed: Sep. 27, 1990

Related U.S. Application Data

[63] Continuation-in-part of Ser. No. 417,238, Oct. 5, 1989, abandoned, which is a continuation-in-part of Ser. No. 235,120, Aug. 23, 1988, abandoned.

[51] Int. Cl.⁵ .............................................. C23F 11/18
[52] U.S. Cl. .................... 252/389.54; 428/461
[58] Field of Search ................... 252/389.54; 428/461

[56] References Cited

U.S. PATENT DOCUMENTS

| | | | |
|---|---|---|---|
| 1,995,615 | 3/1935 | Jaeger | 44/398 |
| 2,078,488 | 4/1937 | Farnham | 206/521.15 |
| 2,156,357 | 5/1939 | Simpson | 422/8 X |
| 2,294,525 | 9/1942 | Waugh | 252/389.5 |
| 2,607,744 | 2/1947 | Viles | 252/389.5 |
| 2,629,649 | 2/1953 | Wachter | 252/392 X |
| 2,848,298 | 8/1958 | Ross et al. | |
| 2,898,026 | 8/1959 | Aid | 422/9 X |
| 2,914,424 | 11/1959 | Murray | 427/237 |
| 3,169,116 | 2/1965 | Baseman et al. | 252/394 X |
| 3,282,838 | 11/1966 | Knowles et al. | |
| 3,356,280 | 12/1969 | Dunholter | 239/57 |
| 3,425,954 | 6/1969 | Ruzevick et al. | |
| 3,433,577 | 3/1969 | Shick | 252/387 X |
| 3,573,225 | 3/1971 | Kondo | 252/390 |
| 3,749,598 | 3/1975 | Kushima et al. | 428/341 |
| 3,887,481 | 6/1975 | Korpics | |
| 3,936,560 | 2/1976 | Santurri et al. | 252/390 X |
| 3,967,926 | 7/1976 | Rozenfeld et al. | |

(List continued on next page.)

FOREIGN PATENT DOCUMENTS

1800001 4/1970 Fed. Rep. of Germany .

OTHER PUBLICATIONS

A. Wachter et al., "Dicyclohexylammonium Nitrite, A Volatile Inhibitor for Corrosion Prevention Packaging", *Corrosion–National Association of Corrosion Engineers*, vol. 7, 1951, pp. 284–294.

*Primary Examiner*—Deborah L. Kyle
*Assistant Examiner*—Valerie Fee
*Attorney, Agent, or Firm*—Haugen and Nikolai

[57] ABSTRACT

A vapor phase corrosion inhibitor formulation comprising a finely divided anhydrous molybdate selected from the group consisting of anhydrous sodium molybdate, anhydrous ammonium dimolybdate, and anhydrous amine molybdates having the structural formula:

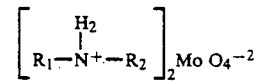

wherein $R_1$ is an aliphatic hydrocarbon having up to 7 carbon atoms, and wherein $R_2$ is either hydrogen or an aliphatic hydrocarbon having up to 7 carbon atoms with these anhydrous molybdates being provided in admixtures with sodium nitrite and benzotriazole. The formulations of the present invention have been found to be particularly desirable as a vapor phase corrosion inhibitor when in contact with the environs of metals susceptible to corrosion including, for example, iron, steel, copper, and alloys such as alloys of iron, copper, and the like. In a preferred embodiment, the amine-molybdate compounds are those amine-molybdates derived from dicyclohexylamine, 2-ethylhexylamine, and cyclohexylamine. The resultant amine-molybdates have vapor pressures which contribute to appropriate protection against corrosion, as well as a continued or ongoing availability of that protection, and when provided in admixture with sodium nitrite and benzotriazole, find particular applicability for extrusion with polyolefin films such as polyethylene and polypropylene, and with such films being capable of forming laminates with metallized second film layers.

13 Claims, 1 Drawing Sheet

U.S. PATENT DOCUMENTS

| | | | |
|---|---|---|---|
| 3,990,872 | 11/1976 | Cullen | 55/274 |
| 4,040,798 | 8/1977 | Kuhn et al. | 252/392 |
| 4,051,066 | 9/1977 | Miksic et al. | 252/389.5 |
| 4,116,701 | 9/1978 | Conner, Sr. | 252/394 X |
| 4,124,549 | 11/1978 | Hashiudo et al. | 252/389.2 X |
| 4,218,385 | 8/1980 | Pike | 252/389.5 |
| 4,275,835 | 6/1981 | Miksic et al. | 252/390 X |
| 4,308,168 | 12/1981 | Sato et al. | 252/389.61 |
| 4,321,060 | 3/1982 | Sung et al. | 252/392 X |
| 4,321,297 | 3/1982 | Adelman | 428/238 |
| 4,338,209 | 7/1982 | Manabe et al. | 252/389.2 X |
| 4,370,388 | 1/1983 | Mito et al. | 428/461 |
| 4,419,105 | 6/1975 | Sung | 252/392 X |
| 4,453,786 | 6/1984 | Landell | 312/31.1 |
| 4,973,448 | 11/1990 | Calson et al. | 252/389.54 |

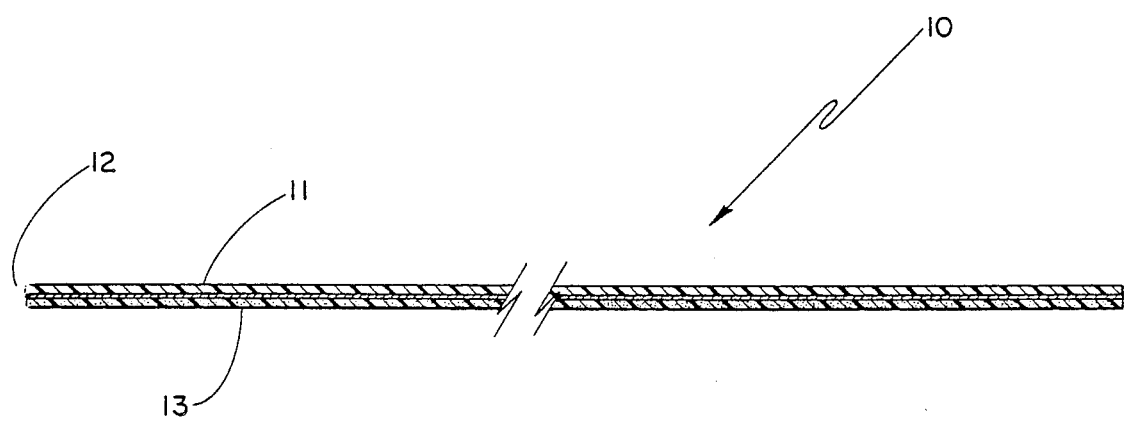

VAPOR PHASE CORROSION INHIBITOR MATERIAL

CROSS-REFERENCE TO RELATED APPLICATIONS

This is a Continuation-in-Part of our co-pending application Ser. No. 07/417,238, filed Oct. 5, 1989, now abandoned, entitled "VAPOR PHASE CORROSION INHIBITOR MATERIAL", which in turn was a Continuation-in-Part of application Ser. No. 07/235,120, filed Aug. 23, 1988, entitled "VAPOR PHASE CORROSION INHIBITOR MATERIAL", now abandoned.

FIELD OF THE INVENTION

The present invention relates to a formulation which is particularly adapted for use as a vapor phase corrosion inhibitor, the material being useful for either inhibiting the corrosion of the metallic items and/or passivating the surfaces thereof, the formulation being particularly adapted for direct incorporation within synthetic resinous films through extrusion or deposition into a film, such as into an olefinic film, polyethylene, or the like. Specifically, the compositions of the present invention comprise a vapor phase corrosion inhibitor selected from the group consisting of anhydrous sodium molybdate, an anhydrous ammonium dimolybdate, and mixtures of such molybdates with sodium nitrite and benzotriazole, with these compositions providing a vapor phase corrosion inhibitor which may be extruded with a film material and placed within the confines of an enclosure housing the item being protected. Alternatively, the materials may be placed within packages containing items which are to be protected from corrosion. For most purposes, anhydrous mixtures of certain molybdates including anhydrous sodium molybdate, ammonium dimolybdate and amine molybdates along with mixtures of such molybdates with sodium nitrite and benzotriazole are preferred for these applications, with this mixture further being preferably extruded into polyethylene film at a rate of from between about 2 percent and 3 percent by weight.

As an added feature of the invention, film materials extruded with the formulations of the present invention may, in turn, be laminated to a second metallized film, such as, for example, metallized polyethylene terephthalate. The combined laminate provides a means to reduce and/or eliminate static build-up in or along the film, and accordingly improves the properties of the film when employed as an enclosure.

BACKGROUND OF THE INVENTION

In commerce and industry today, the useful life of corrodible items may be extended and/or preserved by providing corrosion inhibitors which protect the corrodible item from the adverse effects of its ambient environment. Corrosion inhibitors, particularly vapor phase corrosion inhibitors, have been found useful in protecting certain corrodible items against reaction with elements or compounds which may be found within their environment, and thereby losing their effectiveness, reducing their useful life, or otherwise diminishing their value. Such protection is typically needed during times of packaging, handling, shipment, or during end use. Elements or compounds which are normally of primary concern are gases such as oxygen, water vapor, sulfides, carbon dioxide, and the like. The formulations of the present invention find particular application in the preparation of packaging material, particularly through in-situ extrusion of the material with such films, with the films thereafter forming an envelope or other enclosure about the article being protected. These films may also be employed as a member of a multi-layer laminate including a metallized film having good tear resistant properties such as stress-oriented polyethylene terephthalate containing a vapor deposited film or layer of metallic aluminum. Such films are commercially available and are commonly designated as "aluminized" films.

Among the common indications of corrosion manifested in useful metallic articles are oxidation, pitting, tarnishing, mottling, or discoloration of the surfaces of these items. These manifestations occur in the articles, particularly when exposed to oxygen and in either gaseous or liquid phase. Additionally, sulfides may present corrosion or tarnishing problems as well. Inasmuch as both oxygen and water, including water vapor, occur normally and are available in nature, it is normally necessary to take precautions against corrosion when packaging metallic items for shipment, or when subjecting such items to normal use. Metals which are frequently found to be susceptible to corrosion under normal atmospheric and ambient conditions are iron, steel, copper, brass, aluminum, silver, and alloys of these metals. The formulations of the present invention are particularly useful in providing protection to both ferrous and non-ferrous metals, including such non-ferrous metals as aluminum, copper and brass. Care must frequently be taken to protect articles fabricated from such metals, even when their surfaces have been treated so as to be provided with sacrificial or aesthetic coatings of zinc or cadmium on their surfaces. Such sacrificial or aesthetic coatings are, of course, in wide use, but restrictions of use of these materials may appear from time to time due to their potential contribution to pollution or the like. Accordingly, means must be provided to find alternate techniques for the protection and/or preservation of metallic articles.

In the past, it has been known to provide a package or other enclosure which includes one or more inhibiting compounds along with the corrodible item or items to be protected. Additionally, articles have been protected by means of utilization of protective coatings in the form of solids, liquids, greases, or pastes, however such coatings tend to be temporary in nature and further present certain disadvantages to normal handling and packaging. Furthermore, removal of such protective coatings may present problems either due to incomplete removal, or the costs of such removal. The present invention finds application as a component which may be co-extruded, with the film forming the enclosure about the article being protected.

Solid phase and liquid phase compounds have been used in the past to provide a source of vapor phase corrosion inhibitors. These materials typically undergo either evaporation or sublimation so as to provide the substantially constant availability of the inhibitors. In other words, vapor phase corrosion inhibitors typically emit vapors which protect corrodible surfaces through the deposition or condensation of a protective film or coating upon the surface. In order to be assured that a constant supply of inhibitor be present, adequate quantities of the solid phase or liquid phase corrosion inhibiting compounds must be provided, with the corrosion inhibiting compounds being released at or adjacent the location where needed.

When a laminate is formed in which one layer comprises a heat sealable film such as polyethylene with compounds of the present invention extruded in-situ, and with a second layer being a material such as metallized stress-oriented polyethylene terephthalate, a desirable combination of properties are achieved. Specifically, the polyethylene film layer retains its conventional heat sealing properties, while the stress-oriented polyethylene terephthalate provides a tear-resistant property. The metallized layer is utilized to reduce and/or eliminate static build-up, thereby further enhancing the properties and qualities of the laminate. Stress-oriented polyethylene terephthalate is normally biaxially oriented, and is, of course, commercially available.

SUMMARY OF THE INVENTION

In accordance with the present invention, a solid phase material has been found which provides a source of vapor phase corrosion inhibiting material, with the vapor pressure of the material being balanced with the quantities normally required to be emitted for effective and long term protection of the metallic surfaces being exposed for treatment. The formulations of the present invention provide for emission of vapors in a concentration which is appropriate for strong protection of the metallic surfaces, and yet at a rate sufficiently low so as to provide for relatively long-lasting and long-term effective economic treatment. The formulations of the present invention are compatible with and may be extruded or otherwise deposited with synthetic resinous films, such as aliphatic hydrocarbon or olefinic films such as polyethylene and polypropylene. Such films may be incorporated with other films in a laminate, and in particular may be combined with a metallized film so as to enhance the static elimination and mechanical properties of the composite.

Additionally, the vapor phase corrosion inhibitors of the present invention have been found to produce little, if any, visible residue The lack of residue enhances the utility of the materials, inasmuch as little, if any, mechanical or electrical problems result from the continuous use of these materials.

Typical corrosion inhibiting articles and materials used in the past are disclosed in Miksic et al U.S. Pat. No. 4,051,066 and Miksic et al U.S. Pat. No. 4,275,835.

The formulations of the present invention have been found to be particularly well adapted to be employed as an extrudate with films fabricated from aliphatic hydrocarbon such as polyethylene and polypropylene. For facilitating such extrusion operations, anhydrous molybdates such as ammonium dimolybdate, sodium molybdate and amine molybdates are utilized. Generally speaking, the formulations of the present invention are utilized for retention and/or packaging within modestly porous envelopes or other enclosures formed of plastic film or plastic foam. Typically, those certain enclosures disclosed and claimed in the Miksic et. al. U.S. Pat. Nos. 4,051,066 and 4,275,835, as identified hereinabove, are well adapted for use with the formulations or compounds of the present invention. Also, when extruded with a heat sealable film such as polyethylene, a metallized (aluminized) layer such as biaxially stress-oriented polyethylene terephthalate may be employed to enhance the mechanical properties of the overall arrangement. Techniques for laminating these films together are, of course, well known in the art.

In accordance with the present invention, the vapor phase corrosion inhibitors which have been found particularly desirable for use in combination with metallic surfaces susceptible to corrosion comprise anhydrous sodium molybdate [Na$_2$MoO$_4$], anhydrous ammonium dimolybdate [(NH$_4$)$_2$MoO$_4$], or an anhydrous amine-molybdate having the general structural formula:

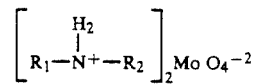

wherein R$_1$ is an aliphatic hydrocarbon having up to 7 carbon atoms, and wherein R$_2$ is either hydrogen or an aliphatic hydrocarbon having up to 7 carbon atoms. The preferred amine molybdates of this component of the present invention are amine-molybdates derived from the group consisting of dicyclohexylamine, 2-ethylhexylamine, and cyclohexylamine. Such molybdates are readily synthesized and can be prepared in anhydrous form without requiring unusual processing or handling problems. As indicated above, these molybdates are utilized in anhydrous form when extruded with the film, and are employed in a mixture in combination with sodium nitrite and benzotriazole. Alternatively, anhydrous sodium molybdate and ammonium dimolybdate may be utilized in combination with sodium nitrite and benzotriazole In use, these materials provide a highly desirable balance between continuous emission from the solid phase, with this emission being at a rate sufficiently low so as to provide for relatively effective long-term and economic protection and treatment.

It is therefore a primary object of the present invention to provide an improved vapor phase corrosion inhibitor which is particularly adapted for use in the protection of metallic surfaces exposed to environments which are corrosive to the exposed surfaces.

It is a further object of the present invention to provide an improved vapor phase corrosion inhibitor which is formulated so as to possess a vapor pressure or other property which allows transport of the inhibitor to the metal surface appropriate for transport of appropriate quantities of the inhibitor from solid phase in the film to the metal surface, with the balance of the inhibitor being retained in the film, to provide a continuous supply of emitted corrosion inhibiting material.

It is yet a further object of the present invention to provide an improved vapor phase corrosion inhibitor substance which is formulated so as to be capable of extrusion with conventional aliphatic hydrocarbon resinous films such as polyethylene, polypropylene, and the like.

It is still a further object of the present invention to provide an improved vapor phase corrosion inhibitor substance which is formulated so as to be capable of extrusion with conventional heat sealable films such as polyethylene, with such polyethylene films being, in turn, laminated to a metallized second film so as to enhance mechanical properties as well as static elimination properties of the composite laminate.

Other and further objects of the present invention will become apparent to those skilled in the art upon a study of the following specification, appended claims, and accompanying drawing.

IN THE DRAWING

The figure is a cross-sectional view of a typical laminate prepared in accordance with the present invention, with the center or metallized layer being shown in somewhat exaggerated form due to limitations of draftsmanship.

DESCRIPTION OF THE PREFERRED EMBODIMENT

In accordance with the preferred embodiment of the present invention, a particularly useful vapor phase corrosion inhibitor for extruded polyethylene film includes a mixture of either anhydrous sodium molybdate, anhydrous ammonium dimolybdate, or amine molybdates, together with sodium nitrite and benzotriazole. Specifically, in a particularly preferred embodiment, a mixture is provided in the following formulation:

| Component | Percent by Weight |
| --- | --- |
| Anhydrous sodium molybdate | 70% |
| Sodium nitrite | 25% |
| Benzotriazole | 5% |

This mixture is particularly effective when extruded into polyethylene film at a rate of 2% by weight. Effective mixtures have been found when extruded into polyethylene film at a rate of up to 3% by weight.

In the formulation provided above, the useful range of the components may be set forth as follows:

| Component | Percent by Weight |
| --- | --- |
| Anhydrous sodium molybdate | 65%–75% |
| Sodium nitrite | 22%–28% |
| Benzotriazole | 4%–6% |

These ranges may be found useful for certain applications.

While there are various techniques that may be employed for providing the appropriate extrudate including, for example, polyethylene and a vapor phase corrosion inhibitor of the type described herein, one particular technique has been found to be particularly useful. Specifically, the formulation is formed and rendered as uniform as possible, and passed through the barrel of a conventional extruder to form a master batch. The resultant master batch is then chopped and rendered into pellet form. These pellets are, in turn, extruded as the film containing a vapor phase corrosion inhibitor of the type described.

In order to describe alternate materials useful in connection with the present invention, the synthesis of three amine-molybdate compounds will be described hereinbelow, it being understood that each resultant compound possesses appropriate physical and chemical properties in its anhydrous form so as to be highly useful in connection with the various aspects of the present invention.

The aliphatic amines employed are from the group consisting of dicyclohexylamine, 2-ethylhexylamine, and cyclohexylamine, it being understood that other aliphatic amines within this general category may be found useful as well.

AMINE-MOLYBDATE "A"

Pursuant to this embodiment, dicyclohexylamine having a molecular weight of 181.36 and the empirical formula $C_{12}H_{23}N$ is employed. The method and procedure set forth in Example I hereinbelow is followed.

EXAMPLE I

A formulation is prepared with the following components:

| Component | Percent by Weight |
| --- | --- |
| Dicyclohexylamine | 10% |
| Phosphoric acid | 4% |
| Water | 36% |
| Aqueous solution of ammonium molybdate (20%) | 50%. |

The 20% ammonium molybdate solution is prepared by adding pure molybdenum trioxide to a 5% aqueous solution of ammonium hydroxide. The Ph of the resulting solution is normally in the range of 7.5 to 8.5. The dicyclohexylamine, phosphoric acid and water are mixed together to form a neutral to slightly alkaline solution, the pH being in the range of 7.5 to 8.5. The 20% aqueous solution of ammonium molybdate is then added. The reaction that occurs is a simple displacement reaction in which a white powdery precipitate is formed upon addition of the ammonium molybdate solution. Following the completion of the reaction, the mixture is cooled to approximately 60° F., after which the precipitate is filtered, washed, and dried until the anhydrous form is obtained. The anhydrous finished product is a fine white powder having the following structural formula:

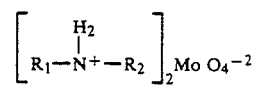

wherein $R_1$ and $R_2$ are cyclohexyl radicals.

AMINE-MOLYBDATE "B"

Pursuant to this embodiment, 2-ethylhexylamine having a molecular weight of 129.2 and the empirical formula $C_8H_{19}N$ is employed. The method and procedure set forth in Example II hereinbelow is followed.

EXAMPLE II

A formulation is prepared with the following components:

| Component | Percent by Weight |
| --- | --- |
| 2-ethylhexylamine | 5% |
| Phosphoric acid | 2.5% |
| Water | 67.5% |
| Aqueous solution of ammonium molybdate (20%) | 25%. |

The 20% ammonium molybdate solution is prepared as set forth in Example I hereinabove. The 2-ethylhexylamine, phosphoric acid and water are mixed together to form a neutral to slightly alkaline solution, the pH being in the range of 7.5 to 8.5. The 20% aqueous solution of ammonium molybdate is then added. The reaction that occurs is a simple displacement reaction in which a white powdery precipitate is formed upon addition of the ammonium molybdate solution. Following the completion of the reaction, the mixture is cooled to approximately 60° F., after which the precipitate is filtered, washed, and dried until the anhydrous form is obtained. The anhydrous finished product is a fine white powder having the following structural formula:

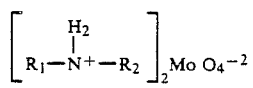

wherein $R_1$ is a 2-ethylhexyl radical and $R_2$ is hydrogen.

AMINE-MOLYBDATE "C"

Pursuant to this embodiment, cyclohexylamine is employed in the preparation of cyclohexylamine-molybdate. Cyclohexylamine having a molecular weight of 99.17 and the empirical formula $C_6H_{11}NH_2$ is employed. The method and procedure set forth in Example III hereinbelow is followed.

EXAMPLE III

A formulation is prepared with the following components:

| Component | Percent by Weight |
|---|---|
| Cyclohexylamine | 20% |
| Molybdenum trioxide (pure) | 13% |
| Water | 67%. |

The water, molybdenum trioxide and cyclohexylamine are mixed together all at once. While mixing, the solution is heated to approximately 175° F. When the solution becomes clear, the mixture is cooled to 60°–70° F., whereupon a grey-white precipitate forms. The precipitate is filtered, washed and dried until the anhydrous form is obtained. The anhydrous finished product is a white crystalline powder with the following structural formula:

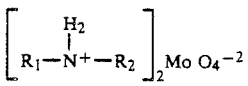

wherein $R_1$ is a cyclohexyl radical and wherein $R_2$ is hydrogen.

GENERAL COMMENTARY

The amine-molybdates as set forth above are, of course, employed in the anhydrous form. It has been found that such molybdates, when employed in the anhydrous form, will be readily incorporated into olefinic films such as polyethylene and polypropylene. Effective mixtures of the amine-molybdates are normally formulated utilizing 70% by weight anhydrous aminemolybdate of the type shown in Examples A, B and C above, 25% sodium nitrite and 5% benzotriazole. As indicated in connection with such formulations discussed above utilizing anhydrous sodium molybdate, these formulations incorporate amine-molybdates A, B or C, are extruded into polyethylene film at a rate of between 2% and 3% by weight.

In accordance with the examples, the aliphatic amine may be present in an amount ranging from between about 5% and 20%. In the interests of completeness of the reaction involved, it has been found that approximately 10% by weight of the aliphatic amine produces a desirable end product. The reactions involved occur quite rapidly and have been found to go substantially to completion at room temperature.

While dicyclohexylamine, 2-ethylhexylamine, and cyclohexylamine have been indicated as the most desirable materials, it will, of course, be appreciated that certain conditions of end use along with certain other considerations and parameters may dictate that somewhat smaller aliphatic chain lengths be employed. For example, use of the material in somewhat cooler environments may render it desirable to utilize materials having a somewhat shorter chain length in order to achieve an appropriate degree of sublimation while exposed to ambience Other considerations may indicate utilization of such shorter chain lengths, as well.

As has been indicated hereinabove, and with attention being directed to the figure of the drawing, the vapor phase corrosion inhibitors of the present invention are well adapted for extrusion with resinous film material typically employed in the packaging industry. When employed as a member or layer of a laminate, and with continued attention being directed to the drawing, the film generally designated 10 includes a first layer of plastic film 11 having a metallic or metallizing layer 12 deposited, thereon. Layer 13 of laminate 10 is impregnated with the compositions of the present invention, with the solid particles being introduced into the film through co-extrusion techniques. For example, the aminemolybdate of Example I is prepared, and introduced as a fine white powder into conventional polyethylene film. This impregnated film is, in turn, laminated to the metallized layer 12 of film 11 so as to form the composite. Laminating techniques for such films are, of course, well known in the art. Metallized films of biaxially oriented polyethylene terephthalate are readily bonded to and laminated with polyethylene films of the type shown at 13.

Vapor phase corrosion inhibitor compounds of the present invention are also well adapted for retention and/or packaging within modestly porous envelopes or other enclosures. These envelopes may be formed of plastic film or plastic foam, or alternatively, may be fabricated from cellulosic products such as paper or the like. In addition to being retained and/or packaged within envelopes or enclosures, the material may be placed upon or within an appropriate substrate formed of either synthetic resin or cellulosic materials. Typical examples of useful material include polyethylene, polypropylene, paper, and the like. When paper is employed, it is preferred that the drying operation be undertaken so as to provide reasonably anhydrous aminemolybdate materials. As a still further alternative, the vapor phase corrosion inhibitors of the present invention may be extruded or co-extruded with synthetic resin materials such as, for example, polyethylene, polypropylene, or the like. Conventional extrusion or co-extrusion techniques may be employed in this regard.

It will be appreciated, therefore, that examples provided herein are for purposes of illustration only and are not to be regarded as a restriction upon the scope of the claims, inasmuch as those skilled in the art may depart from these specific examples without actually departing from the spirit and scope of the present invention.

What is claimed is:

1. A vapor phase corrosion inhibitor in combination with an article comprised of a resinous film wherein said inhibitor comprises a mixture having the following formulation:

| Component | Percent by Weight Range |
| --- | --- |
| Sodium nitrite | 22%–27% |
| Benzotriazole | 4%–6% |
| An anhydrous molybdate selected from the group consisting of sodium molybdate, ammonium dimolybdate, amine molybdates and mixtures thereof | 65–75%. |

2. A vapor phase corrosion inhibitor as defined in claim 1 being particularly characterized in that the mixture has the following formulation:

| Component | Percent by Weight |
| --- | --- |
| Sodium nitrite | 25% |
| Benzotriazole | 5% |
| An anhydrous molybdate selected from the group consisting of sodium molybdate, ammonium dimolybdate, amine molybdates and mixtures thereof | 70%. |

3. A vapor phase corrosion inhibitor comprising, in combination: (a) a solid substrate supporting vapor phase corrosion inhibitor solids having the following formulation:

| Component | Percent by Weight Range |
| --- | --- |
| Sodium nitrite | 22%–28% |
| Benzotriazole | 4%–6% |
| An anhydrous molybdate selected from the group consisting of sodium molybdate, ammonium dimolybdate, amine molybdates and mixtures thereof | 65%–75%. |

4. The vapor phase corrosion inhibitor as defined in claim 3 being particularly characterized in that said substrate comprises an aliphatic hydrocarbon film selected from the group consisting of polyethylene and polypropylene, and wherein said vapor phase corrosion inhibitor solids are retained within said substrate through extrusion, with said film while said film is being formed.

5. The vapor phase corrosion inhibitor as defined in claim 4 wherein said vapor phase corrosion inhibitor solids are included in said film in the range of from between 2% and 3% by weight.

6. A vapor phase corrosion inhibitor in combination with an article comprised of a resinous film wherein said inhibitor comprises a substantially anhydrous amine molybkate in powder form and having the structural formula:

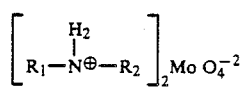

wherein $R_1$ is a 2-ethylhexyl radical and wherein $R_2$ is either hydrogen or an aliphatic hydrocarbon having up to 7 carbon atoms.

7. The vapor phase corrosion inhibitor as defined in claim 6 being particularly characterized in that $R_2$ is a cyclohexyl radical.

8. A vapor phase corrosion inhibitor package comprising, in combination:
(a) a porous modestly permeable envelope enclosing a substantially anhydrous amine-molybdate in powder form and having the structural formula:

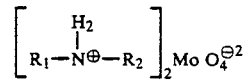

wherein $R_1$ is an aliphatic hydrocarbon having up to 7 carbon atoms, and wherein $R_2$ is either hydrogen or an aliphatic hydrocarbon having up to 7 carbon atoms.

9. The vapor phase corrosion inhibitor package as define din claim 8 being particularly characterized in that $R_1$ and $R_2$ are 2-ethylhexyl radicals.

10. A vapor phase corrosion inhibitor comprising, in combination:
(a) a substrate supporting a substantially anhydrous amine molybdate thereon, the anhydrous amine molybdate in powder form and having the following structural formula:

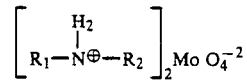

wherein $R_1$ is an aliphatic hydrocarbon having up to 7 carbon atoms, and wherein $R_2$ is either hydrogen or an aliphatic hydrocarbon having up to 7 carbon atoms.

11. The vapor phase corrosion inhibitor as defined in claim 10 being particularly characterized in that said substrate comprises an aliphatic hydrocarbon film selected from the group consisting of polyethylene and polypropylene, and wherein said anhydrous amine molybdate is retained within said substrate through extrusion of the said anhydrous amine molybdate with the film formation.

12. A laminate consisting of first and second film layers bonded to a central metallic layer to form a composite structure and wherein:
(a) said first film comprises a substrate of an aliphatic hydrocarbon film selected from the group consisting of polyethylene and polypropylene having an anhydrous amine molybdate retained therewithin through extrusion, said anhydrous amine molybdate having the following structural formula:

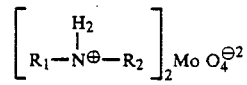

wherein $R_1$ is an aliphatic hydrocarbon having up to 7 carbon atoms, and wherein $R_2$ is either hydrogen or an aliphatic hydrocarbon having up to 7 carbon atoms; and
(b) said second film comprises a layer of biaxially stress-oriented polyethylene terephthalate.

13. The laminate as defined in claim 12 being particularly characterized in that said central metallic layer is a film of aluminum deposited upon the surface of said polyethylene terephthalate film.

* * * * *